United States Patent
Peterson

(10) Patent No.: US 12,227,336 B2
(45) Date of Patent: Feb. 18, 2025

(54) FLEXIBLE WALLED CONTAINER

(71) Applicant: Erik Peterson, Grayslake, IL (US)

(72) Inventor: Erik Peterson, Grayslake, IL (US)

(73) Assignee: Frontier Cooperative, Norway, IA (US)

( * ) Notice: Subject to any disclaimer, the term of this patent is extended or adjusted under 35 U.S.C. 154(b) by 0 days.

(21) Appl. No.: 17/328,377

(22) Filed: May 24, 2021

(65) Prior Publication Data

US 2021/0371166 A1    Dec. 2, 2021

Related U.S. Application Data

(60) Provisional application No. 63/031,096, filed on May 28, 2020.

(51) Int. Cl.
| | | |
|---|---|---|
| *B65D 35/10* | (2006.01) | |
| *B29C 45/16* | (2006.01) | |
| *B29D 22/00* | (2006.01) | |
| *B65D 6/00* | (2006.01) | |
| *B65D 8/00* | (2006.01) | |
| *B65D 23/08* | (2006.01) | |
| *B65D 47/08* | (2006.01) | |
| *B29L 31/00* | (2006.01) | |
| *B65D 43/16* | (2006.01) | |

(52) U.S. Cl.
CPC ............. *B65D 35/10* (2013.01); *B29C 45/16* (2013.01); *B29D 22/003* (2013.01); *B65D 11/02* (2013.01); *B65D 11/10* (2013.01); *B65D 11/20* (2013.01); *B65D 23/08* (2013.01); *B65D 47/0804* (2013.01); *B29K 2023/06* (2013.01); *B29L 2031/712* (2013.01); *B65D 43/16* (2013.01)

(58) Field of Classification Search
CPC .... B65D 35/10; B65D 47/0804; B65D 23/08; B65D 43/16; B65D 11/10; B65D 11/20; B65D 11/02; B29D 22/003; B29K 2023/06; B29L 2031/712; B29C 45/16
See application file for complete search history.

(56) References Cited

U.S. PATENT DOCUMENTS

| | | | | |
|---|---|---|---|---|
| 2,880,902 | A * | 4/1959 | Owsen ....................... | A45F 3/20 285/302 |
| 3,872,994 | A * | 3/1975 | Hyde ..................... | B65D 11/20 220/907 |
| 4,930,644 | A * | 6/1990 | Robbins, III ............ | B65D 1/40 220/8 |
| 5,549,213 | A * | 8/1996 | Robbins, III ...... | B65D 43/0212 215/354 |
| 5,575,398 | A * | 11/1996 | Robbins, III ...... | A47G 23/0241 215/354 |
| 6,231,237 | B1 * | 5/2001 | Geller .................. | B65D 75/008 383/122 |

(Continued)

*Primary Examiner* — Frederick C Nicolas
(74) *Attorney, Agent, or Firm* — Richard C. Himelhoch; UB Greensfelder LLP

(57) ABSTRACT

The invention is directed to a flexible, thin walled seamless container. The container includes a rigid bottom component and a rigid top having an opening. The bottom can be formed to have a first shape, such as a rectangle, and the top can be formed to have a second shape different than the first shape, such as a circle. A cap can be connected to the top to block the opening. The cap can include a pour spout or shaker holes.

13 Claims, 1 Drawing Sheet

(56) References Cited

U.S. PATENT DOCUMENTS

| | | | | |
|---|---|---|---|---|
| 6,561,391 B1* | 5/2003 | Baker | B65D 43/169 | 220/200 |
| 6,761,283 B1* | 7/2004 | Gilliam | B65D 43/0218 | 220/837 |
| 7,524,111 B1* | 4/2009 | Williams | B65D 31/06 | 220/23.91 |
| 8,215,509 B2* | 7/2012 | Kuboi | B65D 1/0292 | 220/666 |
| 8,567,622 B2* | 10/2013 | Yourist | B65D 1/0253 | 220/666 |
| 8,591,109 B2* | 11/2013 | Ackerman | A45C 11/20 | 383/105 |
| 8,708,148 B2* | 4/2014 | Wnek | B65G 59/066 | 220/657 |
| 9,044,082 B2* | 6/2015 | Kusuma | A45F 3/20 | |
| 9,896,253 B2* | 2/2018 | You | B65D 75/008 | |
| 2005/0127074 A1* | 6/2005 | Kusuma | B65D 21/086 | 220/6 |
| 2006/0006184 A1* | 1/2006 | Bohman | A47G 19/2272 | 220/717 |
| 2009/0014457 A1* | 1/2009 | Bennett | B65D 43/163 | 220/834 |
| 2009/0114679 A1* | 5/2009 | Ophardt | B65D 35/02 | 220/666 |
| 2009/0289075 A1* | 11/2009 | Rubinstein | B65D 15/18 | 220/780 |
| 2011/0017625 A1* | 1/2011 | Wycoff | B65D 51/242 | 206/508 |
| 2011/0174423 A1* | 7/2011 | Touchet | B29C 66/542 | 425/112 |
| 2012/0227860 A1* | 9/2012 | Jeremiah | G06Q 20/3278 | 220/666 |
| 2013/0068772 A1* | 3/2013 | Durdon | B65D 51/28 | 220/521 |
| 2013/0248540 A1* | 9/2013 | Darby | B65D 75/5877 | 229/5.5 |
| 2013/0306636 A1* | 11/2013 | Wulf | B65D 43/0212 | 220/259.1 |
| 2014/0151389 A1* | 6/2014 | Melia | B65D 1/10 | 220/796 |
| 2015/0125099 A1* | 5/2015 | Ishihara | B65D 75/5877 | 493/212 |
| 2015/0367992 A1* | 12/2015 | Yi | B29C 65/4835 | 220/678 |
| 2022/0048669 A1* | 2/2022 | Minnette | B65D 17/12 | |
| 2023/0140599 A1* | 5/2023 | Minnette | B65D 11/22 | 220/9.1 |

* cited by examiner

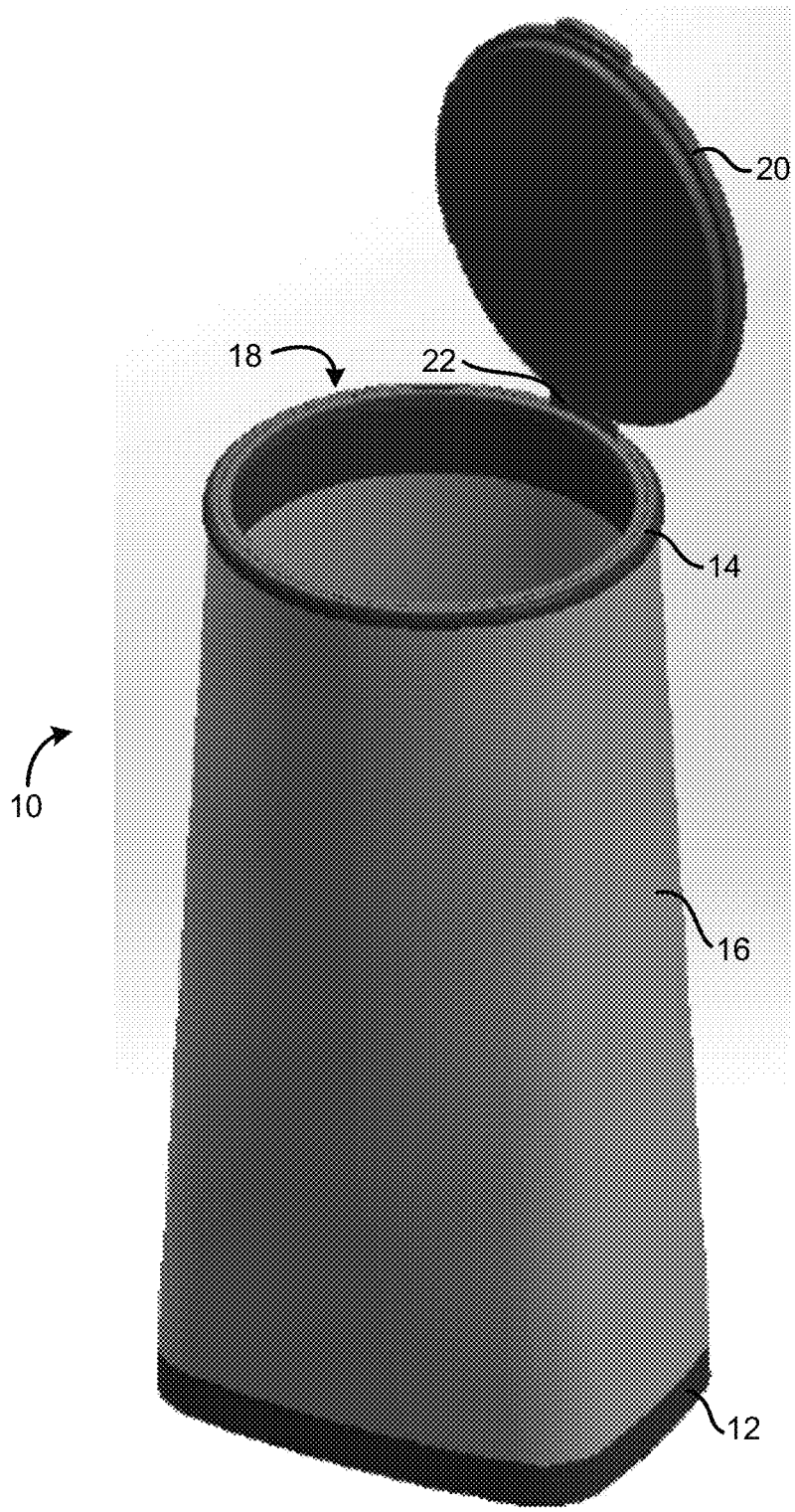

FLEXIBLE WALLED CONTAINER

CROSS-REFERENCE TO RELATED APPLICATIONS

The present invention claims priority to and the benefit of U.S. Provisional Patent Application No. 63/031,096 filed May 28, 2020, the contents of which are incorporated herein by reference and made a part hereof.

FEDERALLY SPONSORED RESEARCH OR DEVELOPMENT

N/A

FIELD OF THE INVENTION

The present invention is directed to a container having a rigid base and top and thin, flexible side wall connected to the base and top.

DESCRIPTION OF THE PRIOR ART

A large number of containers are formed having rigid side walls requiring a thick material capable of maintaining the stiffness of the walls. Such containers can be expensive and weighty.

The present invention provides a lightweight, economically produced container that can be formed in a variety of shapes.

SUMMARY OF THE INVENTION

The present invention is directed to a flexible walled container with a rigid base portion and top portion.

In accordance with an aspect of the invention, a flexible walled container is provided. The container comprises a rigid base having a first shape, a flexible side wall connected to the rigid base and a top having an opening. The top can also be rigid.

The top can have a second shape different from the first shape. For example, the first shape can be generally rectangular and the second shape can be circular. Other shapes can be used for either the first shape or the second shape. In other instances, the top and bottom can be the same shape.

The container further comprises a cap for closing the opening of the top. The cap can be hingedly connected to the top. Alternatively, the cap can be snap fitted to the top or have threads (with corresponding threads formed in the top) to secure it to the top. The cap can be provided with a pour spout. Alternatively, the cap can be provided with a plurality of holes so the container can be used as a shaker.

The flexible side wall can be formed from a continuous sheet that has its edges welded, heat sealed or otherwise connected in a manner that appears seamless. The flexible side wall can be made from a thin polyethylene film.

The base and the top can be formed as injection molded components. The base and the top can also be formed from polyethylene.

In accordance with another aspect of the invention, a method of forming a flexible walled container is provided. The method comprises injection molding a rigid base component having a base shape and injection molding a rigid top component having a top shape. The method further includes forming a continuous side wall with a sheet of flexible material having a lower edge and an upper edge on a mandrel and connecting the lower edge of the flexible material to the base and the upper edge of the flexible material to the top. The method also includes heating a first side edge of the material to a second side edge of the material to form a seamless continuous wall.

The base shape and top can be different shapes. The base shape can be rectangular and the top can be circular. All of the base, top and side wall can be formed from polyethylene.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which:

FIG. 1 is a perspective view of a flexible walled container in an open position in accordance with the present invention.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Aspects of the present invention include:

A package body that is a continuous body made from flexible film (Typically <10 gauge thickness). The film can be made from polyethylene.

The film is recyclable (mono layer) and also has barrier properties.

The flexible film body is produced in a continuous process where the body is formed around a mandrel that determines the shape, including, for example:

Round;
  Oval;
  Rectangular; and,
  Multiple shapes from base to top. For example, in the embodiment shown in FIG. 1, the base is rectangular and the top is circular.

The flexible body can include a vertical heat seal that appears seamless.

Rigid injection molded components are inserted and heat sealed onto the body to form a rigid base and/or top. This process:

Provides rigidity for filling, and consumer use.
  Provides structure for the flexible film to hold its shape.
  Provides for multiple uses by molding various dispensing mechanisms, such as:
    Hinged lids or caps
    Pour spouts;
    Shaker holes; and,
    Cap threads.
  Provides for an aesthetic presentation at store shelf/retail.
  Rigid components are molded from the same plastic (i.e., polyethylene) as the film so the entire package is recyclable.
  The film can be printed to provide high end graphics.
  The entire packaging is extremely lightweight.
  The present container is very economical to produce.

Referring to FIG. 1, a container 10 in accordance with aspects of the present invention is shown. The container 10 includes a rigid base component 12 at the bottom of the container 10, and a rigid top component 14 at the top of the container 10. A thin, flexible sheet of material forms a continuous side wall 16 connected along a bottom edge to the base component 12 and along a top edge to the top component 14.

The base component 12 is a solid piece that covers the bottom of the container 10. The top component forms an opening 18. A lid or cap 20 can be used with the container 10 to cover the opening. The cap 20 can be attached to the top 14 by a hinge element 22. Alternatively, the cap 20 can be fitted to snap into the top 14 to cover the opening 18. In a further alternative, the cap 20 and top portion can include threads to allow the cap 20 to be threadedly secured to the container 10. In a further alternative, the base component 12 can be formed like a top component and include an opening and a cap.

Other materials can also be used for the rigid and flexible components of the present invention. For example, any from the general class of polyolefins, such as polyethylene, polypropylene, low density polyethylene (LDPE), linear low-density polyethylene (LLDPE), medium density polyethylene (MDPE), and high density polyethylene (HDPE). Such polyolefins exhibit good water vapor transmission rate (WVTR) and are low cost. Other materials include ethylene vinyl alcohol (EVOH) which exhibits good gas and chemical barriers, and polyamides (such as Nylon) which exhibits good strength and chemical resistance.

In addition to the above, it may also be useful in some instances to use a multiple layer film, or laminated materials.

Many modifications and variations of the present invention are possible in light of the above teachings. It is, therefore, to be understood within the scope of the appended claims the invention may be protected otherwise than as specifically described.

I claim:

1. A flexible walled container comprising:
   a continuous body having:
   a first component forming a rigid base having a first shape;
   a separate second flexible film component forming a flexible side wall, the flexible side wall connected by a heat seal at a first end to the rigid base; and,
   a separate third component forming a rigid top having an opening, the rigid top connected by a heat seal to the flexible side wall at a second end of the flexible side wall, wherein the rigid top having a second shape different from the first shape, and wherein the flexible side wall transitions continuously from the first shape at the rigid base to the second shape at the rigid top.

2. The container of claim 1 wherein the top includes a rigid injection molded component.

3. The container of claim 2 wherein the base includes a rigid injection molded component.

4. The container of claim 3 wherein the first shape is rectangular.

5. The container of claim 4 wherein the second shape is circular.

6. The container of claim 1 further comprising a cap for closing the opening of the top.

7. The container of claim 6 wherein the cap is hingedly connected to the top.

8. The container of claim 1 wherein the flexible side wall is formed from a continuous sheet.

9. The container of claim 8 wherein the flexible side wall is made from a polyethylene film.

10. The container of claim 4 wherein the second shape is oval.

11. The container of claim 1 wherein the base and the top are injection molded components.

12. The container of claim 11 wherein the base and the top are formed from polyethylene.

13. The container of claim 1 wherein the flexible side wall includes a single vertical heat seal.

\* \* \* \* \*